US011012877B2

(12) United States Patent
Tomala et al.

(10) Patent No.: US 11,012,877 B2
(45) Date of Patent: May 18, 2021

(54) METHOD FOR TRIGGERING FREESTANDING RADIO RESOURCE CONTROL REPORT

(71) Applicant: Nokia Technologies Oy, Espoo (FI)

(72) Inventors: Malgorzata Tomala, Wroclaw (PL); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 380 days.

(21) Appl. No.: 15/373,786

(22) Filed: Dec. 9, 2016

(65) Prior Publication Data

US 2017/0195907 A1 Jul. 6, 2017

Related U.S. Application Data

(60) Provisional application No. 62/269,153, filed on Dec. 18, 2015.

(51) Int. Cl.
*H04W 24/10* (2009.01)

(52) U.S. Cl.
CPC ................... *H04W 24/10* (2013.01)

(58) Field of Classification Search
CPC ....................................................... H04W 24/10
See application file for complete search history.

(56) References Cited

U.S. PATENT DOCUMENTS 7,003,290 B1 * 2/2006 Salonaho ............... H04W 36/30
370/331
2009/0247150 A1 * 10/2009 Fischer ................. H04W 24/10
455/425

(Continued)

FOREIGN PATENT DOCUMENTS

CN 101931981 A 12/2010
CN 102378236 A 3/2012

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.7.0, Sep. 2015, 453 pgs.

(Continued)

*Primary Examiner* — Ivan O Latorre
(74) *Attorney, Agent, or Firm* — Harrington & Smith (57) ABSTRACT

In accordance with the example embodiments there is at least a method and apparatus to determine a measurement configuration for a mobile communication device, wherein the measurement configuration is specific to the mobile communication device; associate a reporting configuration for the mobile communication device; and send the measurement configuration and the reporting configuration to the mobile communication device to trigger the measurement and the reporting at the mobile communication device. Further, in accordance with the example embodiments there is at least a method and apparatus to receive a measurement configuration and a reporting configuration from a network node; and trigger a measurement and a measurement report based on the measurement configuration and the reporting configuration from the network.

14 Claims, 8 Drawing Sheets

(56) References Cited

U.S. PATENT DOCUMENTS

| | | | |
|---|---|---|---|
| 2011/0188396 A1* | 8/2011 | Jung | H04W 24/10 370/252 |
| 2011/0317577 A1* | 12/2011 | Yamada | H04W 24/10 370/252 |
| 2012/0088457 A1 | 4/2012 | Johansson et al. | 455/67.11 |
| 2013/0051274 A1* | 2/2013 | Jeong | H04W 36/0094 370/252 |
| 2013/0070680 A1* | 3/2013 | Iwamura | H04W 24/10 370/328 |
| 2013/0084910 A1* | 4/2013 | Suzuki | H04W 24/02 455/515 |
| 2013/0114446 A1* | 5/2013 | Liu | H04W 24/10 370/252 |
| 2013/0142143 A1 | 6/2013 | Yan et al. | 370/329 |
| 2013/0143624 A1* | 6/2013 | Tsutsui | H04W 4/029 455/561 |
| 2014/0092758 A1* | 4/2014 | Suzuki | H04W 48/18 370/252 |
| 2014/0112184 A1* | 4/2014 | Chai | H04L 5/005 370/252 |
| 2014/0169322 A1* | 6/2014 | Ouchi | H04W 52/146 370/329 |
| 2014/0302865 A1* | 10/2014 | Bai | H04W 24/10 455/452.1 |
| 2015/0295797 A1* | 10/2015 | Kneckt | H04L 43/062 370/252 |
| 2015/0319655 A1* | 11/2015 | Koskinen | H04W 24/10 370/331 |
| 2016/0323762 A1* | 11/2016 | Adachi | H04W 24/10 |
| 2016/0338074 A1* | 11/2016 | Chou | H04W 76/15 |
| 2016/0381610 A1* | 12/2016 | Pu | H04W 36/0055 455/436 |
| 2017/0086087 A1* | 3/2017 | Kim | H04W 24/10 |
| 2018/0041906 A1* | 2/2018 | Jang | H04W 24/10 |
| 2018/0124642 A1* | 5/2018 | Phuyal | H04W 28/08 |
| 2018/0227812 A1* | 8/2018 | Nagasaka | H04W 88/06 |

FOREIGN PATENT DOCUMENTS

| | | |
|---|---|---|
| CN | 102421136 A | 4/2012 |
| CN | 102547840 A | 7/2012 |
| WO | WO-2014/096532 A1 | 6/2014 |
| WO | WO-2015/093556 A1 | 3/2017 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 13)",, 3GPP TS 37.320 V13.1.0, Mar. 2016, 26 pgs.

"Open issues related to UE-based UL delay", 3GPP TSG-RAN WG2 Meeting #92, R2-156513, Nov. 16-20, 2015, 5 pgs.

R2-157146, "Introduction of Rel-13 MDT enhancements", Nokia Networks, 3GPP TSG-RAN2 Meeting #92, Nov. 2015, 32 pgs.

R2-156954, "Further Enhancements of MDT for E-UTRA", Mediatek Inc., 3GPP TSG-RAN WG2 Meeting #92, Nov. 2015, 19 pgs.

Pasupuleti, Kumar Swamy, "How LTE Stuff Works?: RRC Connection Reconfiguration", Nov. 2011, 5 pgs., http://howltestuffworks.blogspot.de/2011/10/rrc-connection-reconfiguration.html.

R2-161414, "[N.162] UL PDCP delay reporting", Nokia Networks, et al., 3GPP TSG-RAN WG2 Meeting #93, Feb. 2016, 7 pgs.

* cited by examiner

| FIG.3A |
|--------|
| FIG.3B |

ASN.1 FOR MEASUREMENT OBJECT FOR MDT PURPOSES:

*MeasObjectMDT*

THE IE *MeasObjectMDT* SPECIFIES INFORMATION APPLICABLE FOR per-UE MEASUREMENTS RELATED TO MDT

*MeasObjectMDT* INFORMATION ELEMENT

```
--ASN1START
MeasObjectMDT-r13        SEQUENCE {
    ul-DelayConfig-r13    ul-DelayConfig-r13 OPTIONAL    --Need ON
    ...
}
--ASN1STOP
```

*MeasObjectMDT* FIELD DESCRIPTIONS

*ul-DelayConfig*
USED TO SETUP AND RELEASE UL PDCP PACKET DELAY PER QCI MEASUREMENT CHANGES WOULD ALSO BE NEEDED TO ADD THE NEW MEASUREMENT OBJECT, e.g. LIKE THIS:

FIG.3A

*MeasObjectToAddModList*

THE IE *MeasObjectToAddModList* CONCERNS A LIST OF MEASUREMENT OBJECTS TO ADD OR MODIFY

*MeasObjectToAddModList* INFORMATION ELEMENT

```
--ASN1START
MeasObjectToAddModList ::=        SEQUENCE (SIZE (1..maxObjectId) OF MeasObjectToAddMod
MeasObjectToAddModList-v9e0 ::=   SEQUENCE (SIZE (1..maxObjectId) OF MeasObjectToAddMod-v9e0

MeasObjectToAddMod ::=SEQUENCE {
    measObjectId
    measObject             CHOICE (
                                MeasObjectEUTRA,
                                MeasObjectUTRA,
                                MeasObjectGERAN,
                                MeasObjectCDMA2000,
        measObjectEUTRA
        measObjectUTRA
        measObjectGERAN
        measObjectCDMA2000
        ...,
        measObjectWLAN-r13                       MeasObjectWLAN-r13,
        measObjectMDT-r13                        MeasObjectMDT,
    }
}

MeasObjectToAddMod-v9e0 ::=SEQUENCE {
    measObjectEUTRA-v9e0          MeasObjectEUTRA-v9e0           OPTIONAL    --Cond eutra
}
--ASN1STOP
```

| CONDITIONAL PRESENCE | EXPLANATION |
|---|---|
| eutra | THE FIELD IS OPTIONAL PRESENT, NEED OR, IF FOR THE CORRESPONDING ENTRY IN *MeasObjectToAddModList* FIELD *measObject* IS SET TO *measObjectEUTRA* AND ITS SUB-FIELD *carrierFreq* IS SET TO *maxEARFCN*. OTHERWISE THE FIELD IS NOT PRESENT AND THE UE SHALL DELETE ANY EXISTING VALUE FOR THIS FIELD. |

REPORTING CONFIGURATION FOR MDT PURPOSES

FIG.3B

ReportConfigMDT

THE IE *ReportConfigMDT* SPECIFIES CRITERIA FOR TRIGGERING PERIODICAL MDT-RELATED E-UTRA MEASUREMENT REPORTING. THE QUANTITIES TO BE REPORTED ARE INDICATED INSIDE THE OBJECT.

*ReportConfigMDT* INFORMATION ELEMENT

```
-- ASN1START
ReportConfigEUTRA ::=    SEQUENCE {
    ul-DelayConfig-r13       OPTIONAL                              -- Need ON
    reportInterval,
    reportAmount             ENUMERATED {r1, r2, r4, r8, r16, r32, r64, infinity}
    includeLocationInfo      ENUMERATED {true} OPTIONAL,           -- Need ON
    useWhiteCellList-r13     BOOLEAN           OPTIONAL,           -- Need ON
    ...
}
-- ASN1STOP
```

METHOD FOR TRIGGERING FREESTANDING RADIO RESOURCE CONTROL REPORT

CROSS-REFERENCE TO RELATED APPLICATIONS

This application claims the benefit of U.S. Provisional Application No. 62/269,153, filed on Dec. 18, 2015 for inventors Malgorzata Tomala and Tero Henttonen and entitled "METHOD FOR TRIGGERING FREESTANDING RADIO RESOURCE CONTROL REPORT," the disclosure of which is hereby incorporated by reference in its entirety.

TECHNICAL FIELD

The teachings in accordance with the example embodiments of this invention relate generally to wireless communication systems, methods, devices and computer programs measurement collecting and reporting tests in a wireless communication system, sometimes termed minimization of drive tests and, more specifically, relate to a Radio Resource Control report for minimization of drive test (MDT) features.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

| | |
|---|---|
| 3GPP | 3rd Generation Partnership Project |
| ASN.1 | Abstract Syntax Notation One |
| IE | Information Element |
| MDT | Minimization of Drive Tests |
| PDCP | packet data convergence protocol |
| QCI | QoS class identifier |
| QoS | Quality of service |
| RRC | Radio Resource Control |
| RRM | Radio Resource Management |
| UE | User Equipment |
| UL | Uplink |

The Radio Resource Control (RRC) protocol is part of different telecommunication systems. The RRC protocol provides connection establishment and release, broadcast of system information, radio bearer establishment, reconfiguration and release, RRC connection mobility procedures, paging notification and release and outer loop power control functions. An RRC protocol can be in different states including an RRC idle mode (no connection) that has lower energy consumption, and an RRC connected mode. The RRC protocol operates to configure the user and control planes according to the network status of a link of a telecommunication system.

Operations that can be performed while a UE is in a specific RRC state pertain use of the telecommunication system's resources. Network optimization, that is, the placement and configuration of resources so as to maximize the area in which coverage is provided and the quality of service provided by that coverage, contributes greatly to the efficient use of resources. One way in which operators carry out network optimization is through a Minimization Drive Test (MDT), in which a UE with specialized measurement capabilities, which provides the network with assistance information for coverage and QoS optimization. A UE receiving a service throughout the network is able to collect measurements performed with a UE and pass the measurement results with RRC signaling to the network. A service provider may instruct a UE to perform an MDT (e.g. periodically) for a service provider to gather information such as radio measurements and use this information to assist network optimization.

The example embodiments as described herein relate to novel types of MDT measurement reporting which can utilize an extension of RRC signaling.

SUMMARY

In an example aspect of the invention, there is a method comprising: determining, by a network node, a measurement configuration for a mobile communication device, wherein the measurement configuration is specific to the mobile communication device; associating, by the network node, a reporting configuration for the mobile communication device; and sending the measurement configuration and the reporting configuration to the mobile communication device to trigger the measurement and the reporting at the mobile communication device.

In another example aspect of the invention, there is an apparatus comprising: at least one processor; and at least one memory including computer program code, where the at least one memory and the computer program code are configured, with the at least one processor, to cause the apparatus to at least: determine a measurement configuration for a mobile communication device, wherein the measurement configuration is specific to the mobile communication device; associate a reporting configuration for the mobile communication device; and send the measurement configuration and the reporting configuration to the mobile communication device to trigger the measurement and the reporting at the mobile communication device.

In another example aspect of the invention, there is a method comprising receiving, by a mobile communication device, a measurement configuration and a reporting configuration from a network node; and triggering, by the mobile communication device, a measurement and a measurement report based on the measurement configuration and the reporting configuration from the network.

In yet another example aspect of the invention, there is an apparatus comprising at least one processor; and at least one memory including computer program code, where the at least one memory and the computer program code are configured, with the at least one processor, to cause the apparatus to at least: receive a measurement configuration and a reporting configuration from a network node; and trigger a measurement and a measurement report based on the measurement configuration and the reporting configuration from the network.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The example embodiments of the invention provide a method and apparatus to optimize the MDT measurement operations, particularly in view of the RRC signalling. Specifically, these teachings provide solutions for facilitating a measurement object specific for a UE which may be provided as an extension of an RRC configuration and reporting.

RRC protocol layer exists in the UE and the eNB. The RRC protocol defines the control plane functionalities of the LTE air interface and provides means to establish, maintain and control RRC connection, including UE measurement reporting control [see for example 3GPP TS 36.331]. An eNB configures the UE for measurements with RRC Connection Reconfiguration procedure. In particular, an RRC Connection Reconfiguration message conveys measConfig Information Element, which passes a measurement configuration to the UE. The content of measConfig includes the following pieces, which realize an overall UE measurement configuration for RRM purposes:

Measurement Objects (measObjectId)
Reporting Configurations (reportConfigId)
Measurement Identities (measId)

The measObjectId defines measurement object containing information about the target cells measured (e.g., carrierFreq in associated RAN, which indicates all cells in the frequency) and reportConfigId defines measurement and report criteria (e.g. measurement events). To link a measurement object with a reporting configuration, measurement identity measId is used. The measId used as a reference number in the RRC measurement report.

Minimization of Drive Test (MDT) is a standardized 3GPP feature which involves commercial UEs in automated collection of measurements and reporting them to the network [see for example 3GPP TS 37.320 Universal Terrestrial Radio Access (UTRA) and Evolved Universal Terrestrial Radio Access (E-UTRA); Radio measurement collection for Minimization of Drive Tests (MDT); Overall description; Stage 2]. The fundamental concept aims at replacing dedicated and costly drive testing performed for network optimization. MDT involves regular users of cellular network and makes usage of their data that are collected anyway (e.g., for mobility purposes).

The MDT measurements settings and related signaling is continuously enhanced throughout subsequent 3GPP releases. Operators seek further enhancements to facilitate the ability to gather more and more information than fundamental radio measurements (e.g. RSRP, RSRQ) and to allow possibilities network management simplification. Since variety of new features and UEs' capabilities are being developed, a need for the protocol extensions also arises. According to 3GPP TS 37.320 Rel-13 an MDT extension will be realized by supporting a new UE based metric: UL PDCP delay per QCI. For this purpose RRC signaling and procedures such as in 3GPP TS 36.331 version 12.7.0 need to be enhanced.

Figure 1:
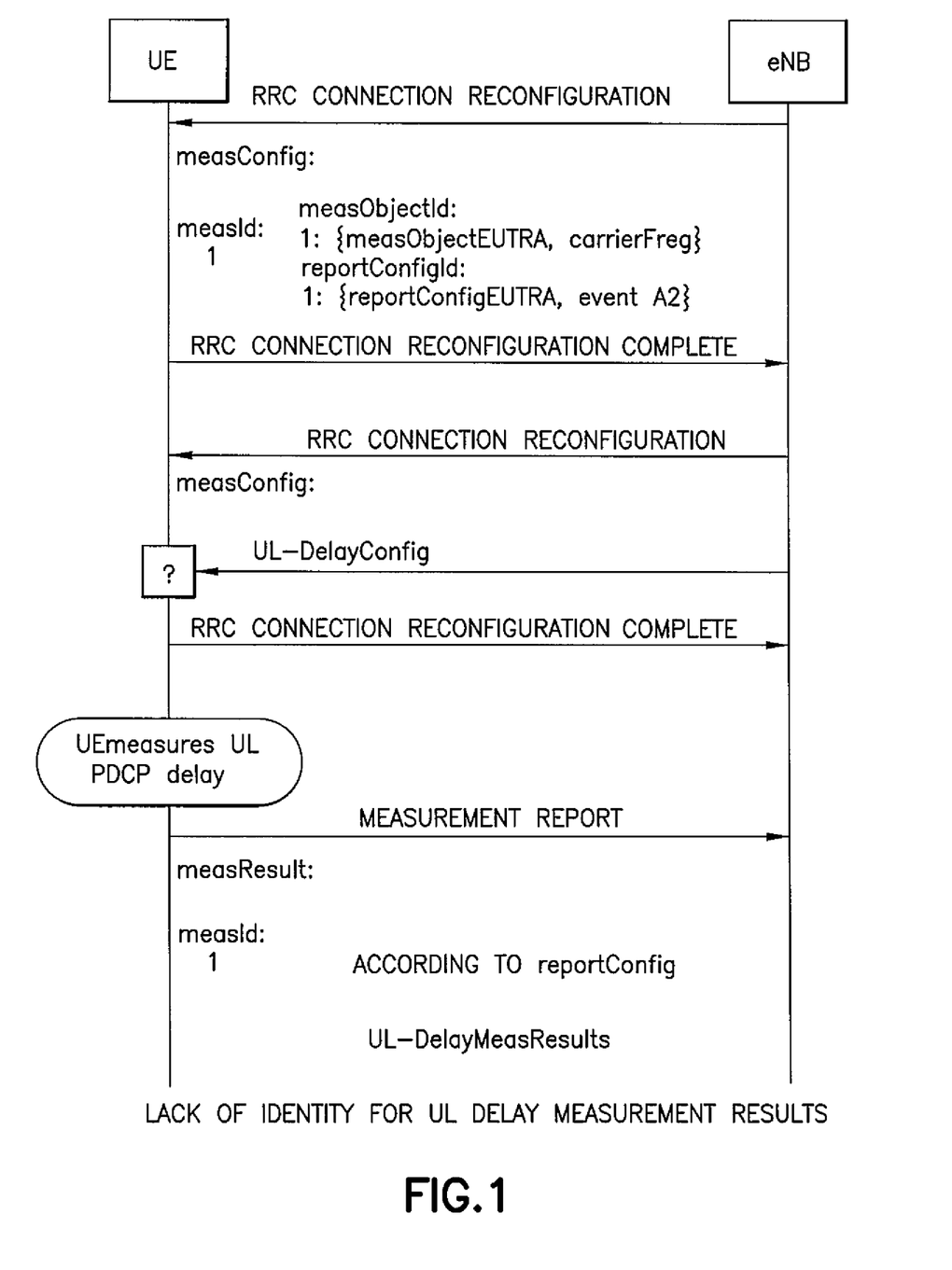
FIG. 1 shows a measurement reporting sequence with a lack of identity for UL delay measurement results.

For the UE-based UL PDCP delay, a UE will be configured with RRC signaling by means of the RRCConnectionReconfiguration message as shown in FIG. 1 However, the existing RRC reporting methods bearing on the measurement object that identifies a cell or frequency do not allow separation of the measurement report from the existing for other purposes configuration. The measurement can be linked to an existing measId and measObjectId, but it is not possible to obtain measurement result with a separated measId, dedicated only for the UL PDCP delay. Thus, FIG. 1 illustrates the problem.

As shown in FIG. 1, in the measurement reporting sequence the RRC Connection Reconfiguration message is sent to the UE. Then the measurement reporting model determined for regular RRM purposes is established by: measObject-measId-ReportConfig setup. Reporting of UL-DelayMeasResult is assumed to be linked to the measId configured by chance. Since the delay measurement is periodical, it cannot be reported as needed, as other reporting criteria might not be fulfilled. Hence, a reporting criterion and report identification remains undefined. The result as shown in FIG. 1 is an uplink (UL) delay measurement results.

It is noted that a dispute on the UL delay measurement configuration was indicated in 3GPP RAN WG2 meeting #92 (as indicated in the draft minutes of the meeting) based on document R2-156513, however detailed analysis of RRC signaling and anticipated UE reporting of the metric suggest that the working assumption (e.g., the measurement report can be linked to an existing preconfigured measId) needs to be revised.

Figure 2:
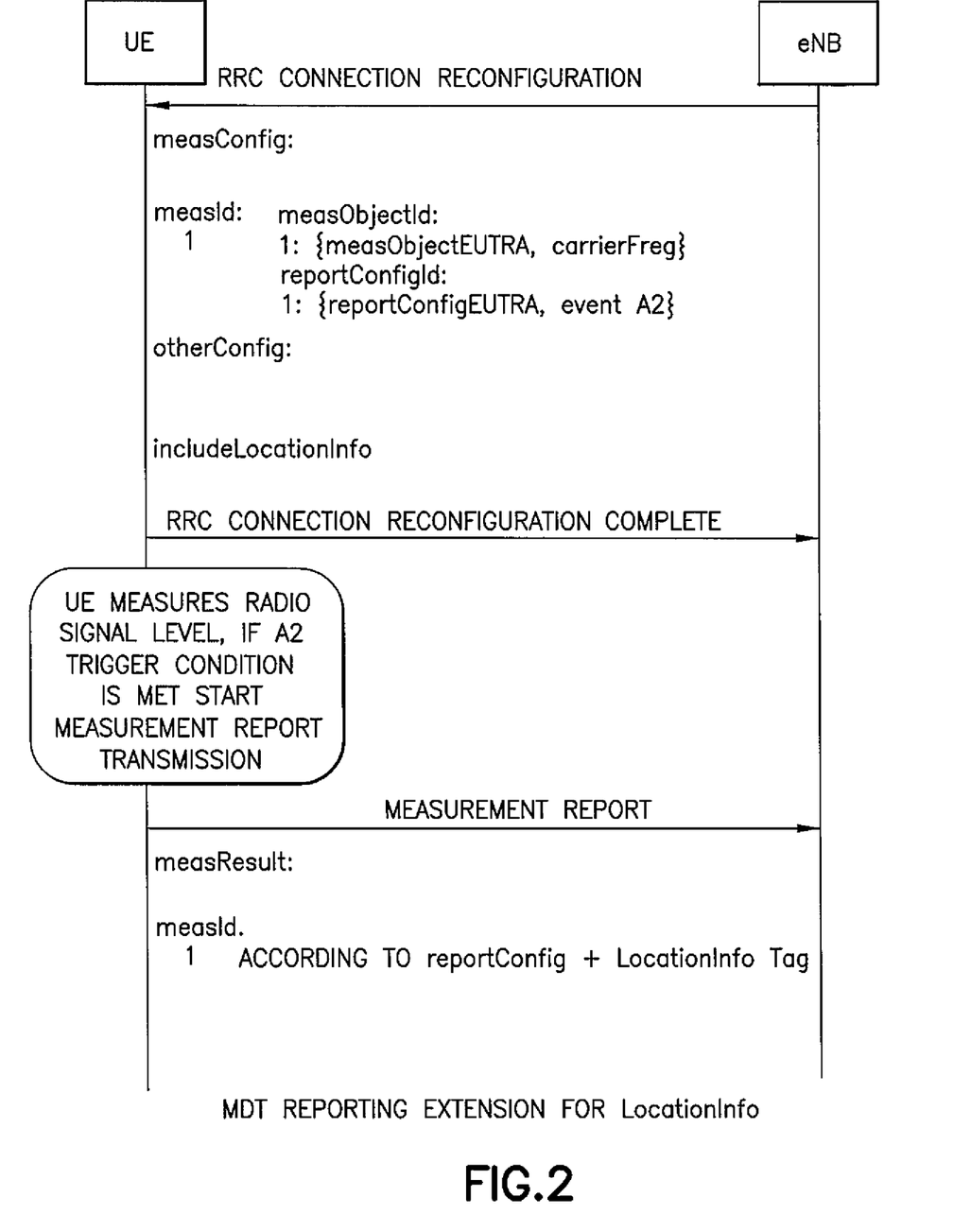
FIG. 2 shows Minimization of Drive Tests reporting extension with location information.

MDT reports originating from the UE consist of radio measurement results available for RRM purposes [see for example 3GPP TS 37.320 and TS 36.331]. MDT has been aiming to make use of the existing and standardized radio measurement results passed via regular RRC signaling with no MDT-specific requirements. Therefore, for MDT measurement results before Rel-13 a content for an MDT report did not differ from the RRC reporting for other purposes. As shown in FIG. 2, the only addition introduced for MDT needs was Location Information (i.e., includeLocationInfo) that was supposed to be linked to the available and measured radio results.

There was no need to have a distinction of the additional information (i.e. LocationInfo), as its linkage to radio measurements was the key and actual purpose (indication of the geographical location of the obtained radio measurement results). Therefore it made sense to get the additional MDT information as a part of RRC report identifiable by a measId (which is coupled with the existing measured cell or frequency object).

The example embodiments of the invention propose a new type of measurement configuration (either a measurement object or a reporting configuration) and an extended model of measurement reporting in RRC signaling. The idea is that there would be a special measurement configuration that is UE-specific instead of being frequency specific. Such a configuration would then contain MDT measurement configuration not tied to a particular frequency but applied per UE, e.g. for PDCP packet delay.

The example embodiments of the invention introduce a new type of measurement configuration (either a measurement object or a reporting configuration) and an extended model of measurement reporting in RRC signaling. The special measurement configuration that is UE-specific instead of being frequency-specific, e.g. for PDCP packet delay or UE-specific for a specified use case (e.g. MDT). The example embodiments of the invention work to:

Create additional measurement object for MDT purposes for triggering a UE based measurement at PDCP layer:

For UL PDCP delay measurement configuration, the measurement object refers to PDCP layer of a UE and be independent from existing measurements objects identifying cells/frequencies;

The measurement object (named e.g. MeasObjectForPDCPDelay or MeasObjectMDT) implies a virtual node at UE's PDCP. It may specify information applicable for PDCP layer measurement performance; and The measurement object may pertain to other referenced points/layers/attributes in the UE, and the main characteristic implies finer granularity than a cell and a frequency of detectable NW. The measurement object pertains to a virtual node implying UE internal action (e.g. performance of measurements) that result in providing some deliverables.

Alternatively, provide a reporting configuration for UE-specific (or UE's attribute-specific) measurements instead of or in addition to an existing measurement object or the MDT-specific measurement object:

The reporting configuration may be linked to the PCell serving frequency but is triggered according to the configuration specified by the reporting parameters (see for example FIG. 6c); and The RRC IE for the reporting configuration (ReportConfigMDT) specifies criteria for triggering periodical MDT-related E-UTRA measurement reporting. The quantities to be reported are indicated inside the object.

A linkage of the new configuration for measurement results in accordance with the embodiments is identifiable by measId, which allows a separate report identification from radio measurements and allows a variety of configuration options for triggering the measurement.

In order to facilitate an extension of RRC report this invention proposes a method where a UE is configured with a measurement object specific for the UE, e.g., for MDT purposes. The configuration of the measurement object acquires an internal UE's action on measurement performance at PDCP layer and associated measurement reporting as a self-interpretable result which can be passed independently from radio measurement results. The implementation of a method in accordance with the example embodiments can include the following mechanisms or any combinations of them:

For triggering a UE based measurement at PDCP layer additional measurement object is created in RRC signaling:

For UL PDCP delay measurement configuration, the measurement object needs to refer to PDCP layer of a UE and be independent from existing measurements objects identifying cells and/or frequencies;

The measurement object (e.g., MeasObjectForPDCPDelay or MeasObjectMDT), when configured by RRC signaling and added to UE's configuration implies a virtual node at a UE's PDCP layer;

It can specify information applicable for PDCP layer measurement performance;

For a future-proof type approach, an embodiment of the invention can consider a measurement object pertaining to other referenced points and/or layers in the UE. The main characteristic should imply finer granularity than cell and a frequency of detectable NW;

The measurement object pertains to a virtual node implying UE internal action (e.g., performance of measurements) that result in providing some deliverables;

The measurement object defines a reference point from where RRC receives the deliverables.

To facilitate an identification of the deliverables (configured by an associated ReportConfigId for example) the existing in standard method is reused with the measId:

An extension to the reporting model is that it has to comply with also a new measurement object; and A UE upon obtaining results from the measurement object triggers a delivery action to the RRC layer;

The results are identifiable by measId reserved/configured for the measurement object (named e.g. MeasObjectForPDCPDelay or MeasObjectMDT;

The way of reporting the results allows:

separate reporting from radio measurement results (separately from MeasObjects defined per cell/frequency: MeasObjectCDMA2000, MeasObjectEUTRA, MeasObjectUTRA, etc.), and/or In case report triggering conditions match: jointly with existing measurement objects (in a single message), but with different measIds, and/or In case a separate reporting trigger is employed for the separate measurement object, it is possible to store the intermediate deliverables (from PDCP layer to RRC layer) in the receiving layer and report them at next reporting occasion.

RRC signaling supports a report coming from the measurement object (different that frequency), does not have to specify what exact information should be included, though. It is left implementation/vendor specific or specified according to the release of signaling the UE supports.

Alternatively, a reporting configuration is provided for UE-specific measurements instead of a measurement object. For such a case, it is assumed that the reporting configuration is linked to the PCell serving frequency but is triggered according to the reporting configuration specified by the reporting parameters.

Figure 3:
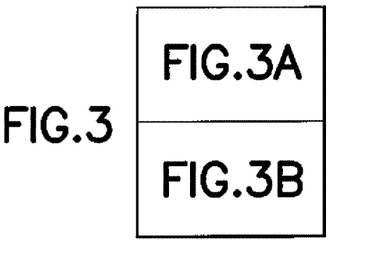
FIG. 3 shows conventional and a changed measurement object for MDT purposes.
Figure 3A:
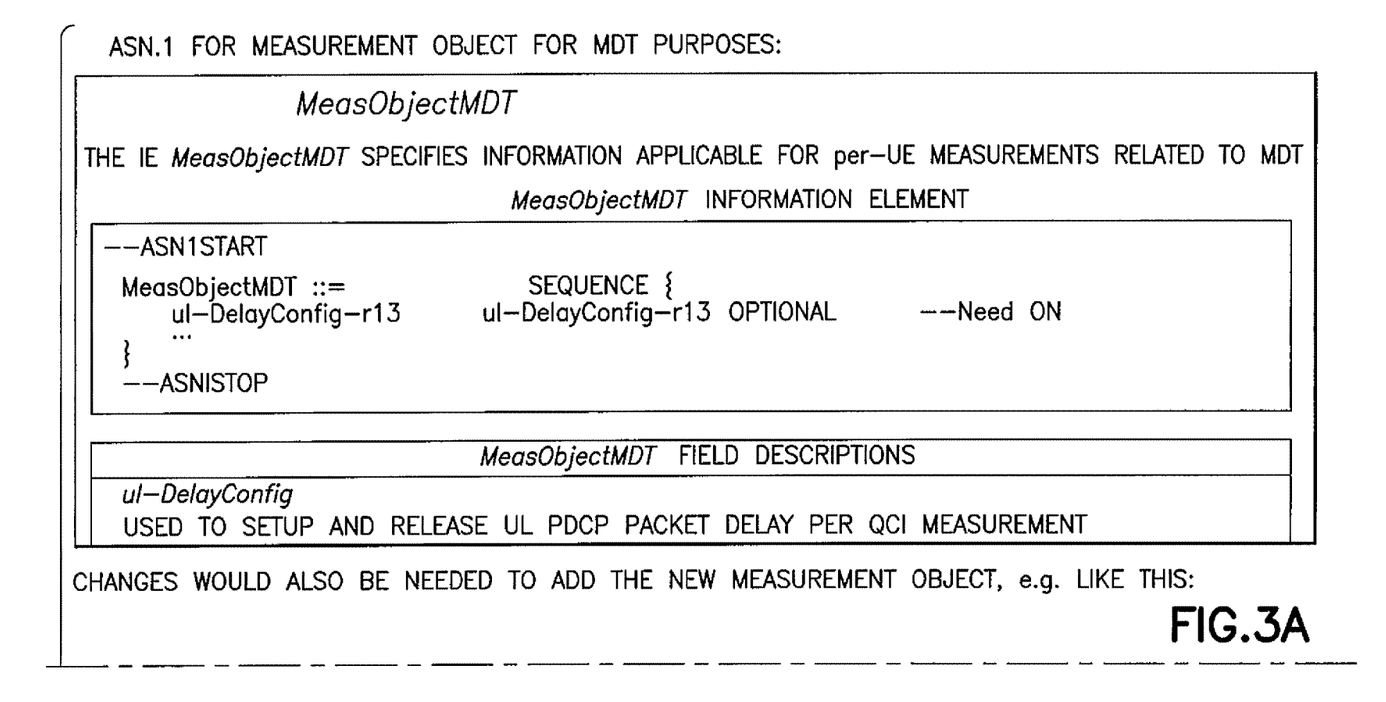
Figure 3B:
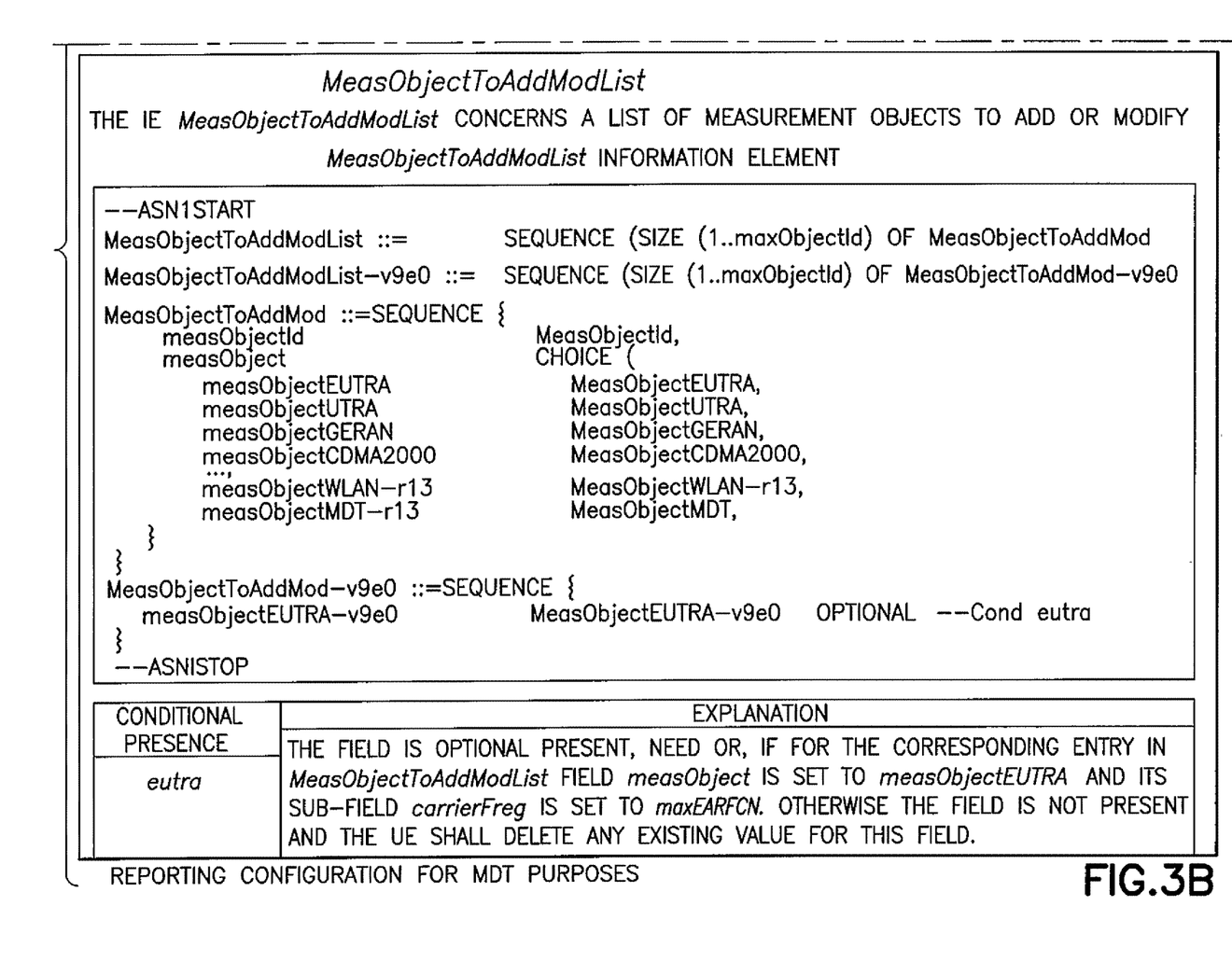

With regards to FIG. 3, Example 1 shows ASN.1 for Measurement object for MDT purposes. Example 2 of FIG. 3 shows a reporting configuration for MDT purposes. Changes to the measurement object in accordance with an example embodiment of the invention are shown in Example 2 of FIG. 3.

Figure 4:
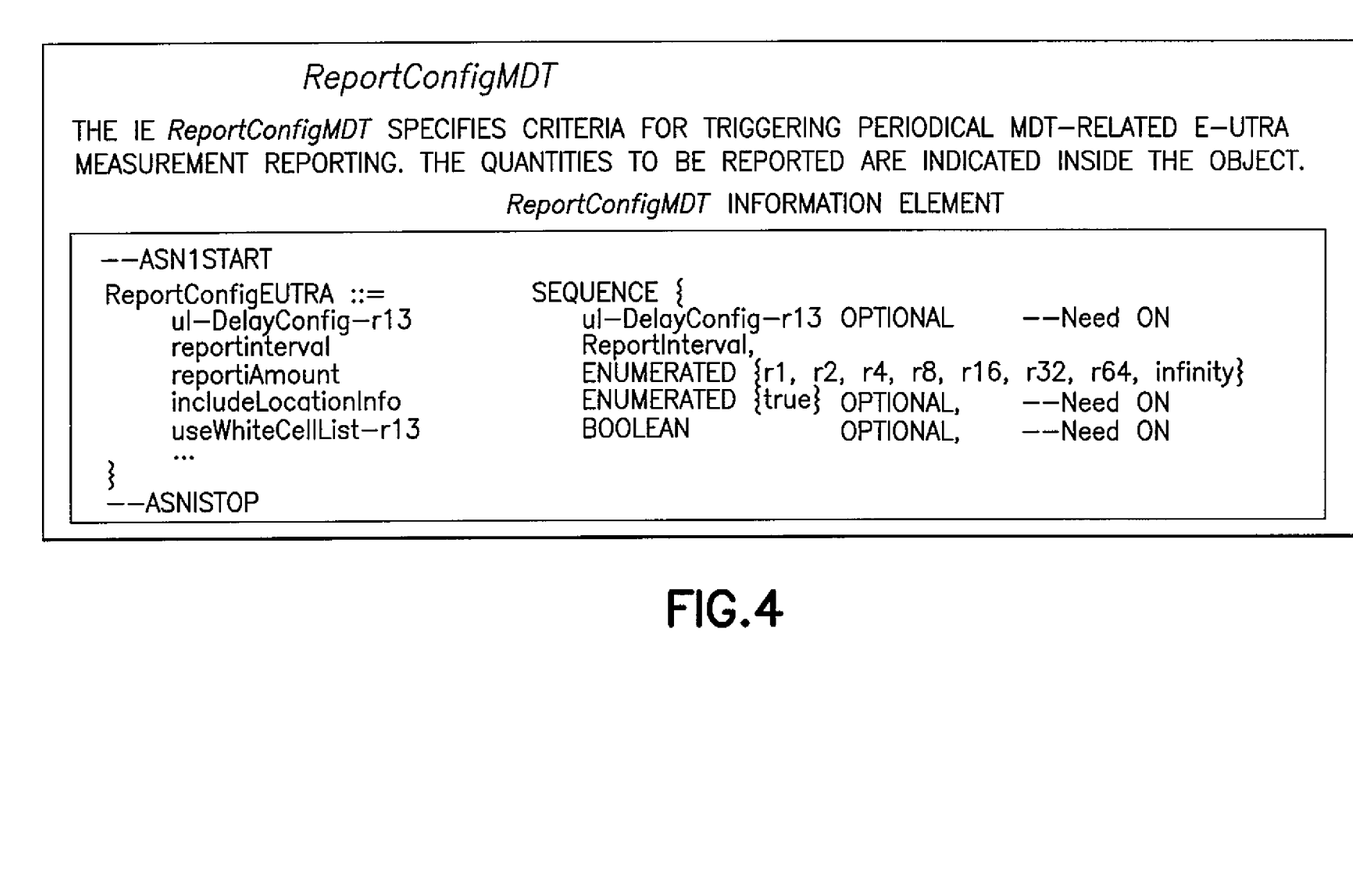
FIG. 4 shows an example of a reporting configuration for Minimization of Drive Tests measurements in accordance with the example embodiments.

FIG. 4 shows an information element of a ReportConfigMDT. An example of a reporting configuration for MDT measurements in accordance with an example embodiment of the invention is shown here. In accordance with the example embodiments changes include an added new measurement object(s) and this report is linked to existing measurement objects, but triggered on a per-UE basis.

A specific measurements results appended to regular specified RRM measurement results do not give a chance to separate MDT specific results for UL PDCP Delay. The described method aims at offering readable and identifiable RRC reports. MDT functionality introduced a specific measurement reports that do not pertain to RRC nor radio measurements. Thus, association of these MDT reports with the existing and available RRC model of reporting will bring troublesome interpretation of the complete reports. A separate way of configuration and reporting handling offers the possibility to enhance MDT efficiency, and also allows measurement reporting for the purpose of MDT. The way proposed in Rel-13 only works if measurement events meant for other purposes trigger and contain the information. The enhanced way of MDT reports handling in accordance with the embodiment would offer some freedom in selection what sort and to what extend assistance information can be collected. At the same time support for the freestanding measurement object for UL PDCP Delay through overall MDT signaling will offer the possibility to consider various options in data collection. Also by allowing this control, care is taken with regards to reports size, overhead and priorities. At least these features provide a statistical approach for MDT configuration and measurements, such as with a significant amount of data and many UEs involved. The additional distinction will help to draw more advanced conclusions on network performance/UE's experience. It should also bring a possibility for clearer and more unambiguous interpretation of the UE reports. Also, especially with an increasing amount of MDT data as will likely be specified for future releases it is even more important to have means for differentiation.

Figure 5:
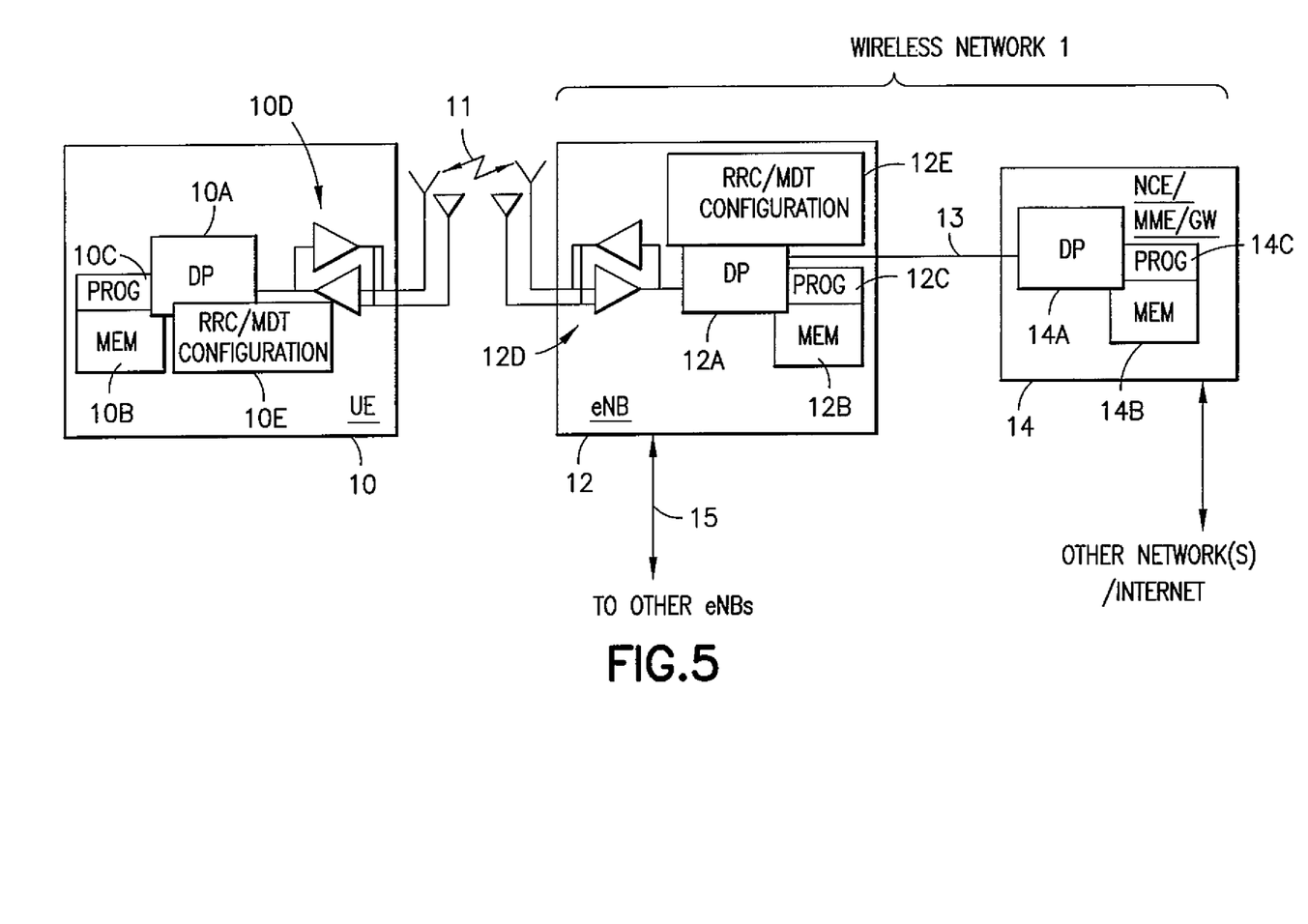
FIG. 5 shows a simplified block diagram of apparatus capable of performing the method according to various example embodiments of the invention.

Reference is now made to FIG. 5 for illustrating a simplified block diagram of various electronic devices and apparatus that are suitable for use in practicing the example embodiments of this invention. In FIG. 5 a wireless network 1 is adapted for communication over a wireless link 11 with an apparatus, such as a mobile communication device which above is referred to as a UE 10, via a network access node, such as a base station or relay station or remote radio head, and more specifically shown as an eNodeB 12. The network 1 may include a network control element (NCE) 14 that serves as a mobility management entity MME and/or a serving gateway S-GW to a broader network such as a publicly switched telephone/data network and/or the Internet.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas. The eNodeB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNodeB 12 is coupled via a data/control path 13 to the NCE 14. In accordance with the example embodiments the NCC 14 can be embodied in MDT configuration entity. The path 13 may be implemented as the S1 interface in the case the network 1 is an LTE network. The eNodeB 12 may also be coupled to another eNodeB via data/control path 15, which may be implemented as the X2 interface in the case the network 1 is an LTE network.

At least one of the PROGs 10C and 12C is assumed to include program instructions that, when executed by the associated DP, enable the device to operate in accordance with the example embodiments of this invention as was detailed by non-limiting example above with respect to at least FIGS. 3 and 4 as described above. That is, the example embodiments of this invention may be implemented at least in part by computer software executable by the DP 10A of the UE 10 and/or by the DP 12A of the eNB 12, or by hardware, or by a combination of software and hardware (and firmware).

For the purposes of describing the example embodiments of this invention the UE 10 may be assumed to also include a program or algorithm 10E for implementing how it may apply, in accordance with the example embodiments, an MDT object configuration based on RRC signaling with the network 1. Similarly in accordance with the example embodiments the eNodeB 12 can include an algorithm or program 12E for applying RRC/MDT configuration and interpreting measurements that it specific for the UE 10.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Note that the various DPs 10A, 12A may be implemented as one or more processors/chips, either or both of the UE 10 and the eNodeB 12 may include more than one transmitter and/or receiver 10D, 12D, and particularly the eNodeB 12 may have its antennas mounted remotely from the other components of the eNodeB 12, such as for example tower-mounted antennas.

The apparatus for performing the method in accordance with the example embodiments may include sending and receiving means for sending and receiving the configurations, and controlling means for making the decisions regarding the configurations. In a particular embodiment the receiving means may be embodied in at least a receiver 10D/12D and the controlling means may be embodied in at least a processor 10A/12A, both of which are illustrated at FIG. 5. The apparatus including at least one processor 10A/12A and at least one memory 10B/12B including computer program code 10C/10E/12C/12E, in which the memory and the computer program code are configured with the at least one processor to cause the apparatus at least to perform the operations as disclosed herein.

Figure 6A:
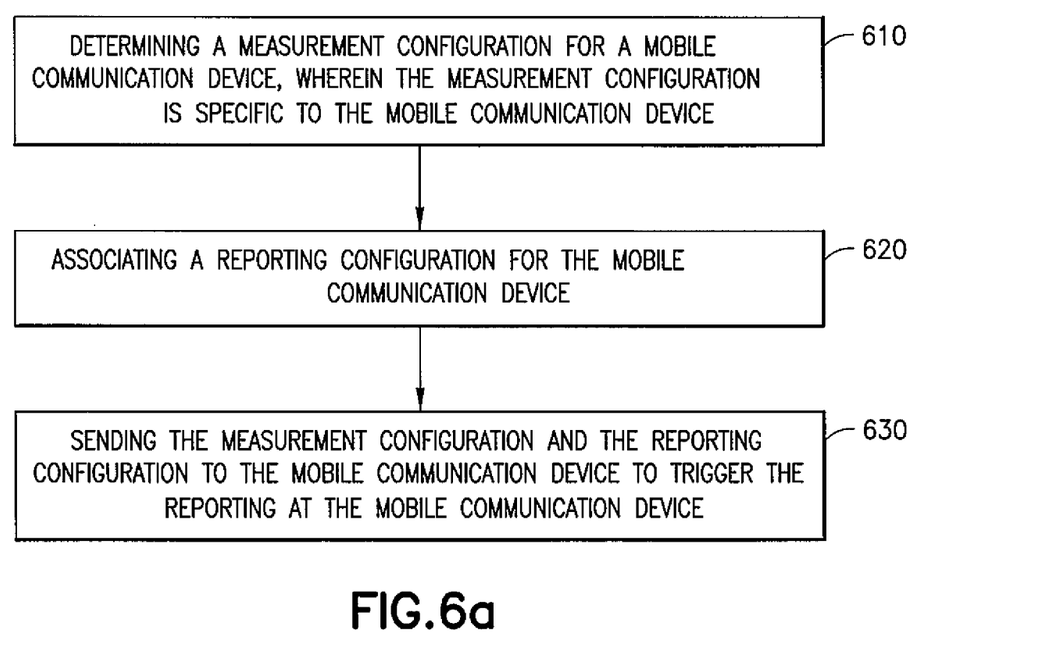
FIGS. 6a, 6b, and 6c each show a method in accordance with example embodiments of the invention which may be performed by an apparatus.

FIG. 6a illustrates operations which may be performed by a network device such as, but not limited to, a network node such as the eNB 12 as in FIG. 5. As shown in step 610 of FIG. 6a there is determining a measurement configuration for a mobile communication device, wherein the measurement configuration is specific to the mobile communication device. Then as shown in step 620 there is associating a reporting configuration for the mobile communication device. Then at step 630 there is sending the measurement configuration and the reporting configuration to the mobile communication device to trigger the measurement and the reporting at the mobile communication device.

In accordance with the example embodiments as described in the paragraph above, the reporting configuration comprises a packet data convergence protocol measurement configuration.

In accordance with the example embodiments as described in the paragraphs above, the sending is using a radio resource control measurement reporting object that specifies criteria for periodically triggering the packet data convergence protocol measurement at the mobile communication device.

In accordance with the example embodiments as described in the paragraphs above, the packet data convergence protocol measurement configuration comprises an uplink packet data convergence protocol packet delay measurement.

In accordance with the example embodiments as described in the paragraphs above, the uplink packet data convergence protocol packet delay measurement is used to setup and release an uplink packet data convergence protocol packet delay reporting per QoS class identifier.

In accordance with the example embodiments as described in the paragraphs above, based on the uplink packet data convergence protocol packet delay measurement the mobile communication device is caused to ignore a measObject configuration and to perform the uplink packet data convergence protocol packet delay measurement regardless of a measObject configuration.

In accordance with the example embodiments as described in the paragraphs above, the measurement configuration comprises a Minimization of Drive Tests measurement configuration.

In accordance with an example embodiment of the invention as described above there is an apparatus comprising: means for determining (DP 12A, RRC/MDT configuration 12E, PROG 12C, and MEM 12B of FIG. 5) a measurement configuration for a mobile communication device, wherein the measurement configuration is specific to the mobile communication device. There are means for associating (DP 12A, RRC/MDT configuration 12E, PROG 12C, and/or MEM 12B of FIG. 5) a reporting configuration for the mobile communication device. Further, there is means for sending (transmitter and receiver 12D of FIG. 5) the measurement configuration and the reporting configuration to the mobile communication device to trigger the measurement and the reporting at the mobile communication device.

In the example aspect of the invention according to the paragraph above, wherein at least the means for determining, associating, and sending comprises a non-transitory computer readable medium [MEM 12B] encoded with a computer program [PROG 12C] and/or [RRC/MDT configuration 12E] executable by at least one processor [DP 12A and/or 12F].

Figure 6B:
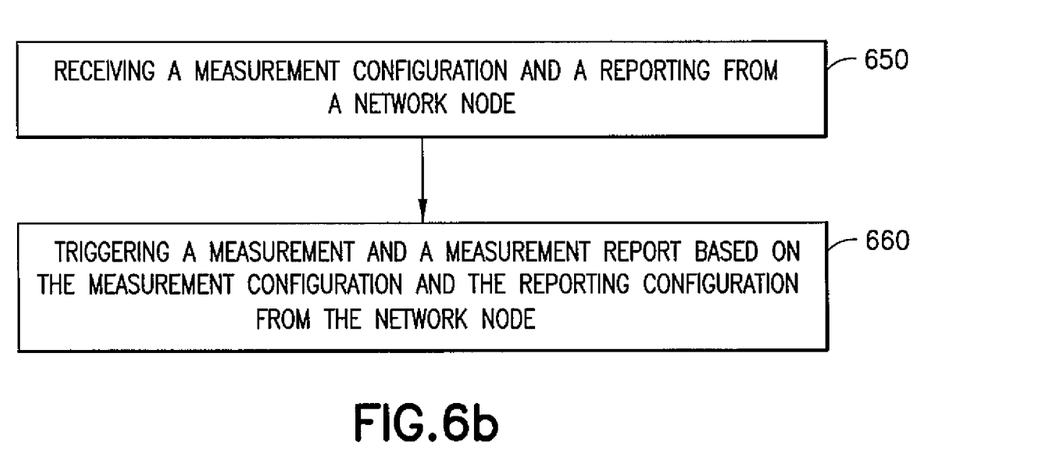

FIG. 6b illustrates operations which may be performed by a device such as, but not limited to, a device (e.g., the UE 10 as in FIG. 5). As shown in step 650 of FIG. 6b, there is receiving a measurement configuration and a reporting configuration from a network node. Then as shown in step 660 of FIG. 6b there is triggering a measurement and a measurement report based on the measurement configuration and the reporting configuration from the network.

In accordance with the example embodiments as described in the paragraph above, the reporting configuration comprises a packet data convergence protocol measurement configuration.

In accordance with the example embodiments as described in the paragraphs above, the receiving is using a radio resource control measurement reporting object that specifies criteria for periodically triggering the packet data convergence protocol measurement at the mobile communication device.

In accordance with the example embodiments as described in the paragraphs above, the packet data convergence protocol measurement configuration comprises an uplink packet data convergence protocol packet delay measurement.

In accordance with the example embodiments as described in the paragraphs above, the uplink packet data convergence protocol packet delay measurement is used to setup and release the uplink packet data convergence protocol packet delay measurement and reporting per QoS class identifier.

In accordance with the example embodiments as described in the paragraphs above, based on the packet data convergence protocol packet delay measurement the mobile communication device is caused to ignore a measObject configuration and to perform the uplink packet data convergence protocol packet delay measurement regardless of a measObject configuration.

In accordance with the example embodiments as described in the paragraphs above, the measurement configuration comprises a Minimization of Drive Tests measurement configuration.

In accordance with an example embodiment of the invention as described above there is an apparatus comprising: means for receiving (transmitter and receiver 10D of FIG. 5) measurement configuration and a reporting configuration from a network node. Further, there is means for triggering (DP 10A, Program 10E, PROG 10C, and/or MEM 10B of FIG. 5) a measurement and a measurement report based on the measurement configuration and the reporting configuration from the network.

In the example aspect of the invention according to the paragraph above, wherein at least the means for receiving and triggering comprises a non-transitory computer readable medium [MEM 10B] encoded with a computer program [PROG 10C and/or 10E] executable by at least one processor [DP 10A].

Figure 6C:
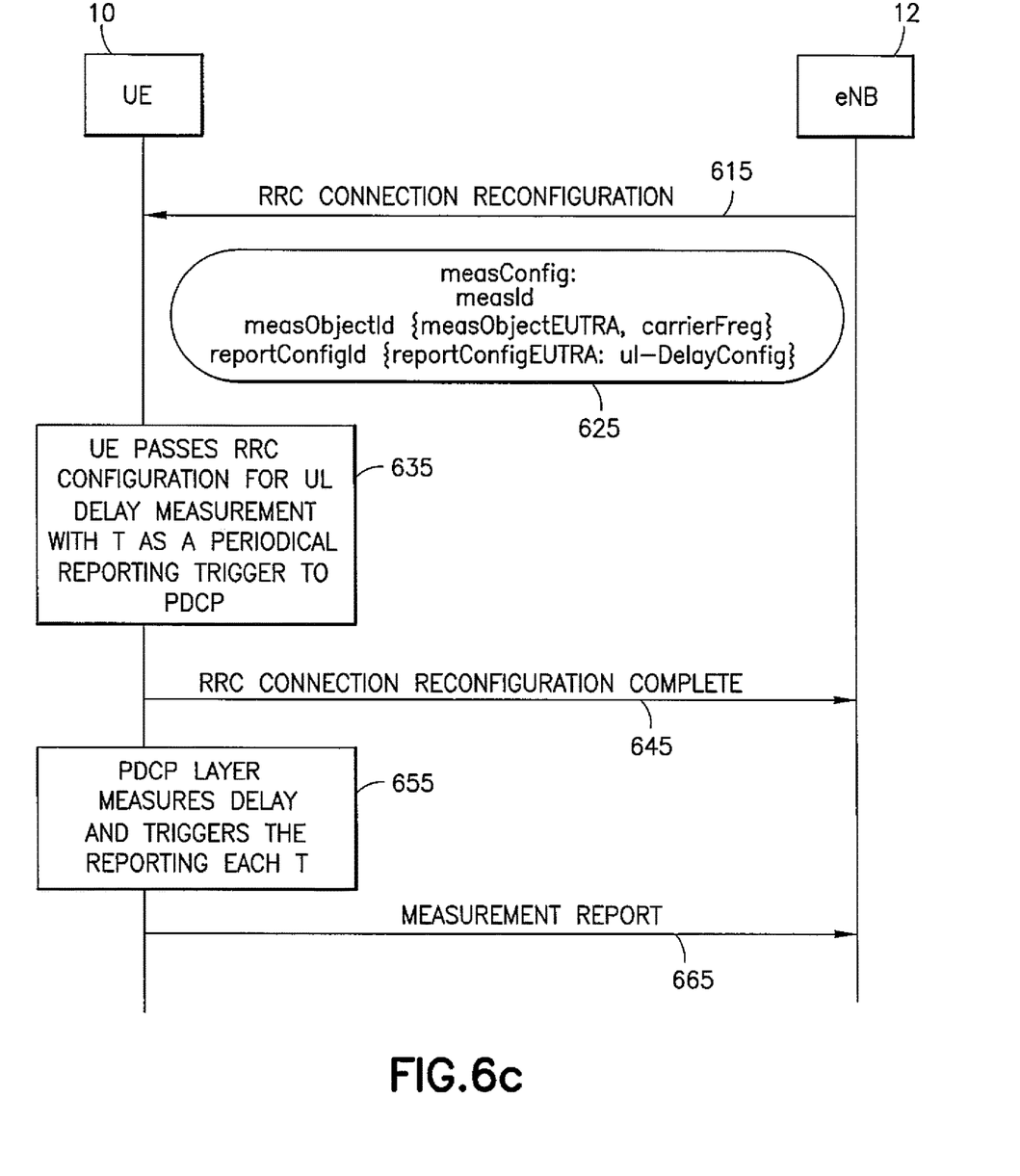

FIG. 6c shows operations in accordance with the example embodiments which may be performed by network devices such as, but not limited to, network nodes such as the eNB 12 and the UE 10 as in FIG. 5. As shown in step 615 of FIG. 6c the eNB 12 signals an RRC Connection Reconfiguration which passes a measConfig object to the UE 10 as shown in step 625. Then at step 635 the UE passes RRC configuration for UL delay measurement with T, a time interval, as a periodical reporting trigger to PDCP. At step 645 of FIG. 6c the UE signals an RRC Connection Reconfiguration Complete to the eNB 12; and at step 655 the UE 10 the PDCP layer measures a Delay and triggers the reporting at each T; and at step 665 the UE 10 send the measurement report towards the eNB 12.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   sending, by a network node, a measurement configuration and a reporting configuration to a mobile communication device to trigger a measurement and measurement report at the mobile communication device,
   wherein the measurement configuration comprises one or more measurement objects,
   wherein the one or more measurement objects identifying frequencies or cells to be measured,
   wherein the reporting configuration comprises criteria for periodically triggering the uplink packet data convergence protocol packet delay measurement,
   wherein the reporting configuration comprises a packet data convergence protocol measurement configuration,
   wherein the packet data convergence protocol measurement configuration comprises an uplink packet data convergence protocol packet delay measurement configuration, and
   wherein the reporting configuration enables reporting a measurement not linked to one or more measurement objects.

2. The method of claim 1, wherein the sending is using a radio resource control information element that specifies criteria for the reporting trigger periodically triggering the measurement configuration at the mobile communication device.

3. The method of claim 1, wherein the measObject configuration comprises at least one of a MeasObjectCDMA2000, MeasObjectEUTRA, or a MeasObjectUTRA that is defined per a cell or frequency associated with the mobile communication device.

4. The method of claim 1, wherein the reporting a measurement not linked to one or more measurement objects comprises ignoring a measObject configuration and performing the uplink packet data convergence protocol packet delay measurement regardless of a measObject configuration.

5. An apparatus comprising:
   at least one processor; and
   at least one memory including computer program code, where the at least one memory and the computer program code are configured, with the at least one processor, to cause the apparatus to at least:
   send, by a network node, a measurement configuration and a reporting configuration to a mobile communication device to trigger a measurement and measurement report at the mobile communication device,
   wherein the measurement configuration comprises one or more measurement objects,
   wherein the one or more measurement objects identifying frequencies or cells to be measured,
   wherein the reporting configuration comprises criteria for periodically triggering the uplink packet data convergence protocol packet delay measurement,
   wherein the reporting configuration comprises a packet data convergence protocol measurement configuration,
   wherein the packet data convergence protocol measurement configuration comprises an uplink packet data convergence protocol packet delay measurement configuration, and
   wherein the reporting configuration enables reporting a measurement not linked to one or more measurement objects.

6. The apparatus of claim 5, wherein the sending is using a radio resource control information element that specifies criteria for the reporting trigger periodically triggering the measurement configuration at the mobile communication device.

7. The apparatus of claim 5, wherein the measurement configuration comprises a Minimization of Drive Tests measurement configuration.

8. A method comprising:
   receiving, by a mobile communication device, a measurement configuration and reporting a configuration from a network node to trigger a measurement and measurement report at the mobile communication device,
   wherein the measurement configuration comprises one or more measurement objects,
   wherein the one or more measurement objects identifying frequencies or cells to be measured,
   wherein the reporting configuration comprises criteria for periodically triggering the uplink packet data convergence protocol packet delay measurement,
   wherein the reporting configuration comprises a packet data convergence protocol measurement configuration,
   wherein the packet data convergence protocol measurement configuration comprises an uplink packet data convergence protocol packet delay measurement configuration, and
   wherein the reporting configuration enables reporting a measurement not linked to one or more measurement objects.

9. The method of claim 8, wherein the receiving is using a radio resource control information element that specifies criteria for the reporting trigger periodically triggering the measurement configuration at the mobile communication device.

10. The method of claim 8, wherein based on triggering conditions of the measObject configuration and a configuration of the measurement reporting matching, measurements for the measObject configuration of the reporting configuration and measurements for the configuration of the measurement reporting are included in the reporting using different measIds.

11. An apparatus comprising:
    at least one processor; and
    at least one memory including computer program code, where the at least one memory and the computer program code are configured, with the at least one processor, to cause the apparatus to at least:

receive a measurement configuration and a reporting configuration from a network node to trigger a measurement and measurement report at a mobile communication device, wherein the measurement configuration comprises one or more measurement objects, wherein the one or more measurement objects identifying frequencies or cells to be measured, wherein the reporting configuration comprises criteria for periodically triggering the uplink packet data convergence protocol packet delay measurement, wherein the reporting configuration comprises a packet data convergence protocol measurement configuration, wherein the packet data convergence protocol measurement configuration comprises an uplink packet data convergence protocol packet delay measurement configuration, and wherein the reporting configuration enables reporting a measurement not linked to one or more measurement objects.

12. The apparatus of claim 11, wherein the receiving is using a radio resource control information element that specifies criteria for the reporting trigger periodically triggering the measurement configuration at the mobile communication device.

13. The apparatus of claim 11, wherein based on triggering conditions of the measObject configuration and a configuration of the measuring matching, measurements for the measObject configuration of the measurement configuration and measurements for the configuration of the measuring configuration are included in the reporting using different measIds.

14. The apparatus of claim 11, wherein the measurement configuration comprises a Minimization of Drive Tests measurement configuration.

* * * * *